(12) United States Patent
McCutcheon (10) Patent No.: US 11,201,371 B1
(45) Date of Patent: Dec. 14, 2021

(54) BATTERY FOR MULTIPLE DRONES AND SYSTEM

(71) Applicant: Johnathan Franklin McCutcheon, Houston, TX (US)

(72) Inventor: Johnathan Franklin McCutcheon, Houston, TX (US)

(*) Notice: Subject to any disclaimer, the term of this patent is extended or adjusted under 35 U.S.C. 154(b) by 230 days.

(21) Appl. No.: 16/522,370

(22) Filed: Jul. 25, 2019

Related U.S. Application Data (60) Provisional application No. 62/703,699, filed on Jul. 26, 2018.

(51) Int. Cl.
*H01M 50/20* (2021.01)
*B64C 37/02* (2006.01)

(52) U.S. Cl.
CPC ............ *H01M 50/20* (2021.01); *B64C 37/02* (2013.01); *B64C 2201/042* (2013.01); *B64D 2221/00* (2013.01); *H01M 2220/20* (2013.01)

(58) Field of Classification Search
CPC ... H01M 50/20; H01M 2220/20; B64C 37/02; B64C 2201/042; B64C 2201/027; B64D 2221/00
See application file for complete search history.

(56) References Cited

U.S. PATENT DOCUMENTS

| | | | |
|---|---|---|---|
| 2011/0301784 A1* | 12/2011 | Oakley | G05D 1/0858 701/2 |
| 2017/0141368 A1* | 5/2017 | Ricci | B60L 53/53 |

\* cited by examiner

*Primary Examiner* — Kwang Han
(74) *Attorney, Agent, or Firm* — Leavitt Eldredge Law Firm (57) ABSTRACT

A battery for a drone, the battery includes a housing having an internal cavity, the housing having a first rail attached to and extending from a bottom of the housing; and a slide extending into a top surface of the housing; the first rail is to engage with a body of the unmanned aerial vehicle at a first location; and the slide is to engage with a second rail extending from the unmanned aerial vehicle at a second location; a power source secured within the housing; a lever extending through the housing and to engage with a control system of the unmanned aerial vehicle.

1 Claim, 8 Drawing Sheets

BATTERY FOR MULTIPLE DRONES AND SYSTEM

BACKGROUND

1. Field of the Invention

The present invention relates generally to drone systems, and more specifically, to a battery for use with multiple drones simultaneously.

2. Description of Related Art

Figure 1:
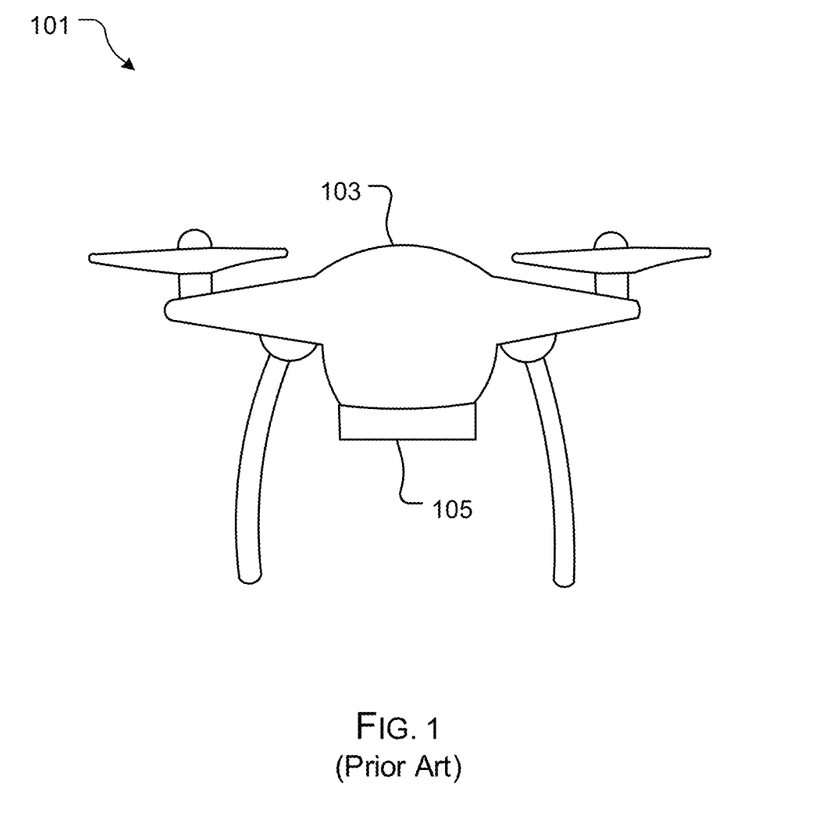
FIG. 1 is a front view of a common drone system.

Drone systems are well known in the art and are effective means to complete tasks such as transporting items, aiding in taking photos, and further provide entertainment. For example, FIG. 1 depicts a conventional drone 101 having a body 103 with a battery 105 engaged therewith. During use, battery 105 provides power to a control system (not shown) of drone 101. Upon battery 105 dying, battery 105 can either be docked and charged or replaced.

One of the problems commonly associated with drone 101 is limited customization.

It is an object of the present invention to provide a drone and battery system that allows the user to engage multiple drones together.

Accordingly, although great strides have been made in the area of drone systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional drone systems. Specifically, the present invention provides a battery configured to attach to two drones, thereby allowing for the drones to be stacked for improved customization and entertainment. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
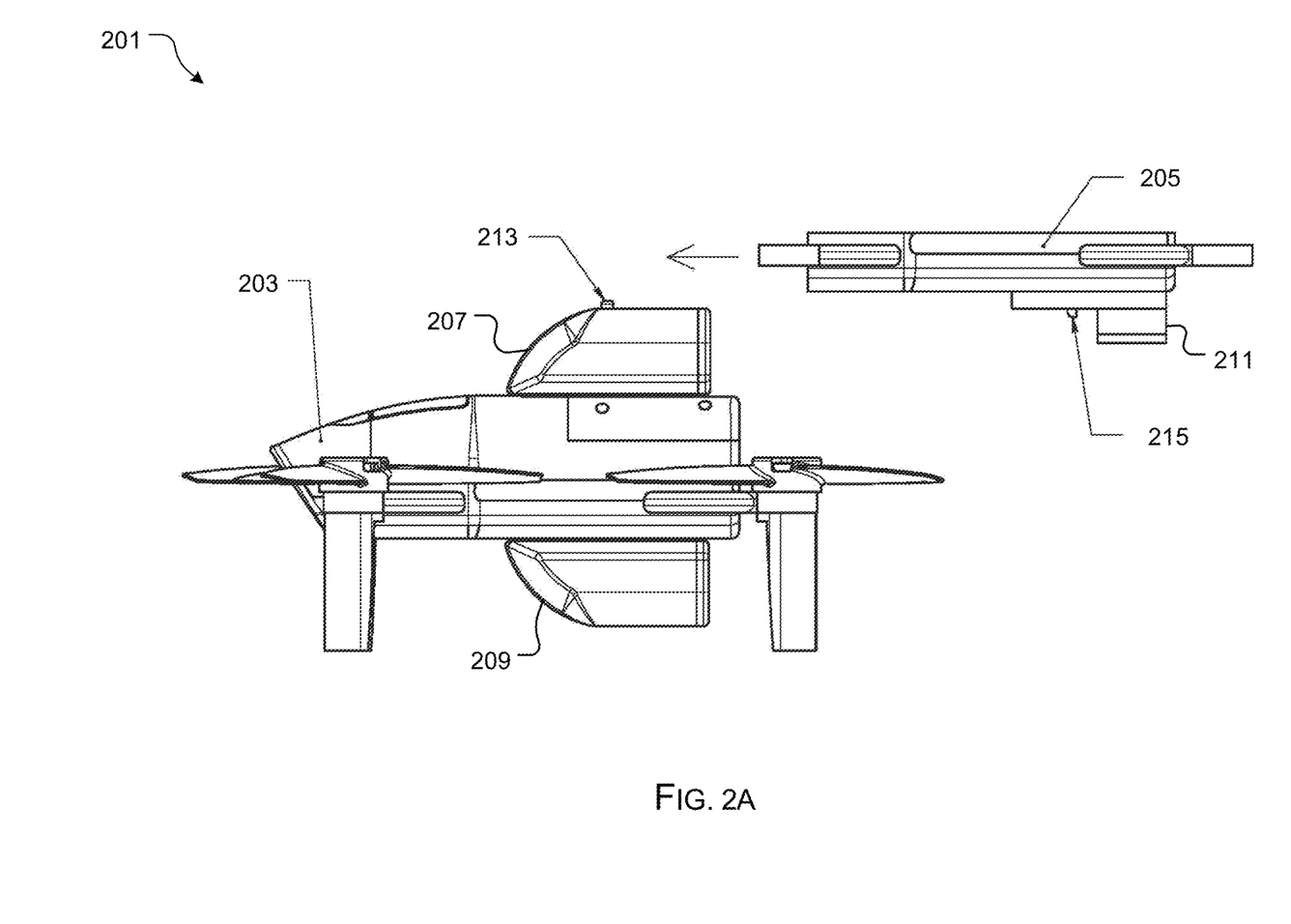
FIGS. 2A and 2B are a side view of a drone system in accordance with a preferred embodiment of the present application.
Figure 2B:
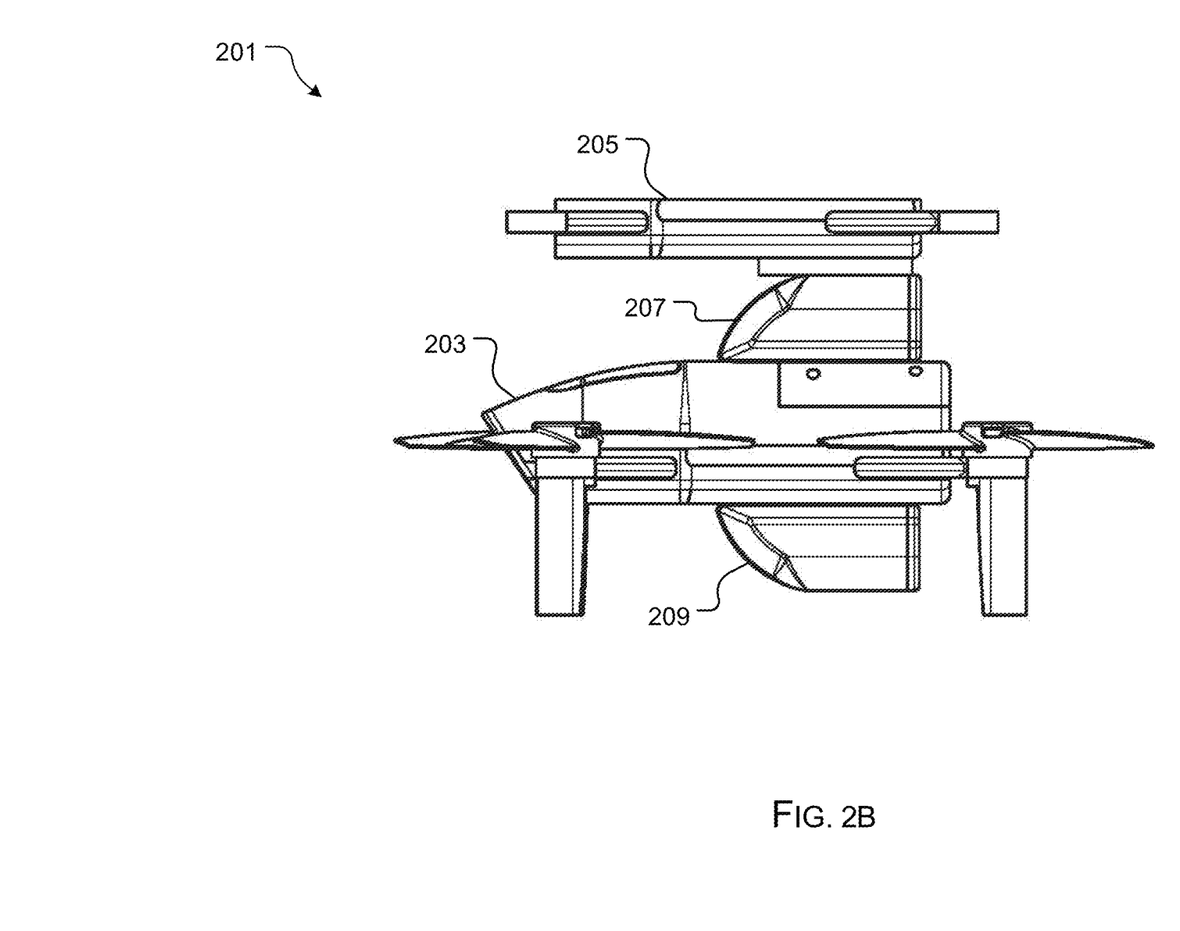

Referring now to the drawings wherein like reference characters identify corresponding or similar elements throughout the several views, FIGS. 2A-B depict side views of a drone system 201 in accordance with a preferred embodiment of the present application. It will be appreciated that system 201 overcomes one or more of the above-listed problems commonly associated with conventional drone systems.

In the contemplated embodiment, system 201 includes a first drone 203 and a second drone 205 (partial view shown) configure to connect via a first battery 207. A second battery 209 is further secured to drone 203 at a second location. It should be appreciated that the batteries and drones are configured to slidingly engage with one another via one or more rails, as will be described. Battery 207 includes a channel (not shown) configured to slidingly receive rail 211 to secure to drone 205. Engaging drone 205 with battery 207 connects a lever 213 to a lever base 215, wherein lever 213 ensures the transfer of power to the drone 205.

It should be appreciated that one of the unique features believed characteristic of the present application is the configuration of the one or more batteries configured to connect to two drones. It should be appreciated that the means of connecting ensures that the two propellers of the two drones are free to move and operate.

Figure 3:
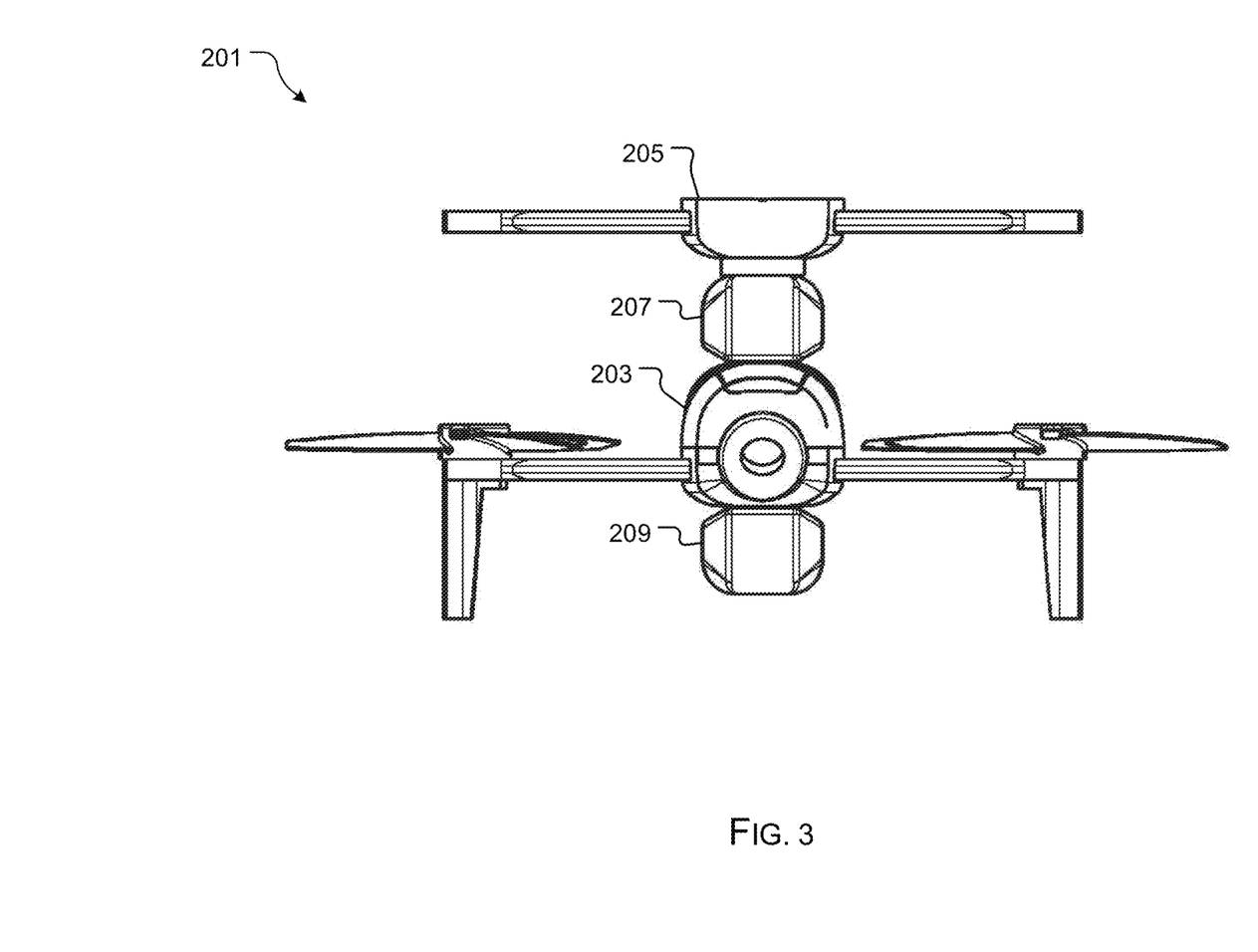
FIG. 3 is a front view of the system of FIGS. 2A and 2B.

In FIG. 3 a front view further depicts the connection of drones 203, 205 and batteries 207, 209.

Figure 4:
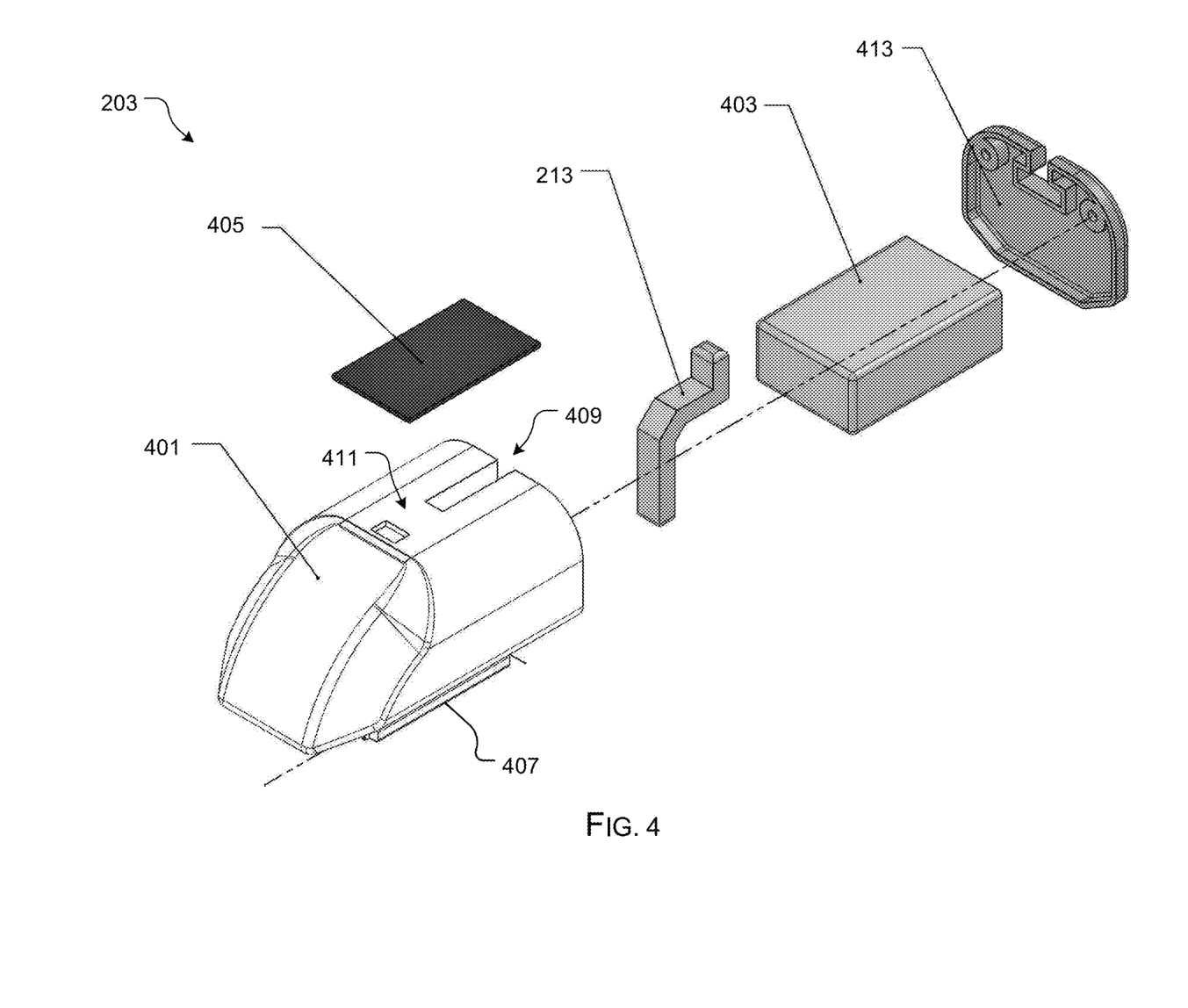
FIG. 4 is an exploded view of a battery of FIGS. 2A and 2B.

In FIG. 4, an exploded view depicts battery 203. Battery 203 includes a housing 401 configured to enclose a power source 403 and a PCB 405, thereby being configured to communicate with a control system of each drone and provide power thereto. A rail 407 extends from a bottom of battery 203 and engages with the body of the drone to secure the two components together. Further, a slide 409 extends into a top surface 411 of body 401 and provides a means to receive a second rail associated with a body of a drone to secure the two together. Lever 213 is further positioned within the housing and extends therethrough. The housing and other components are further secured together via a cover 413.

Figure 5:
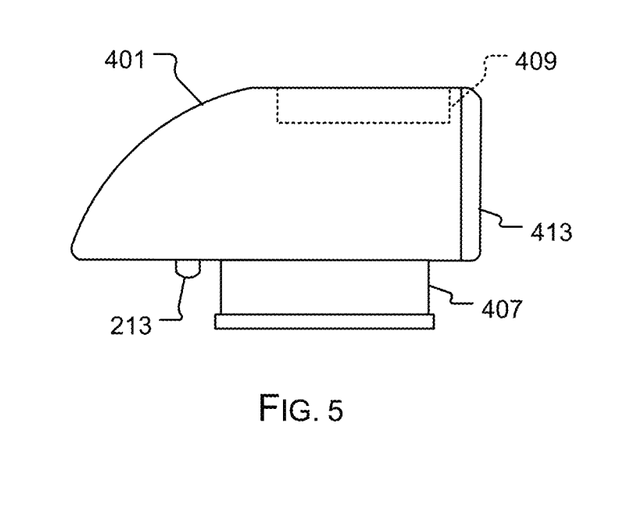
FIG. 5 is a side view of the battery of FIG. 4.
Figure 6:
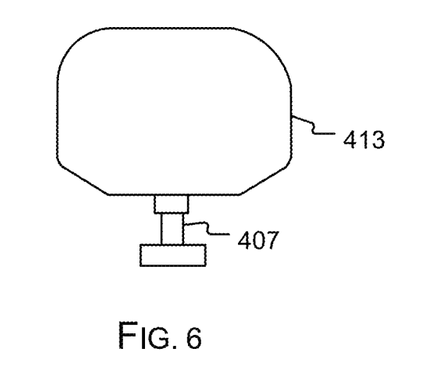
FIG. 6 is a rear view of the battery of FIG. 4.
Figure 7:
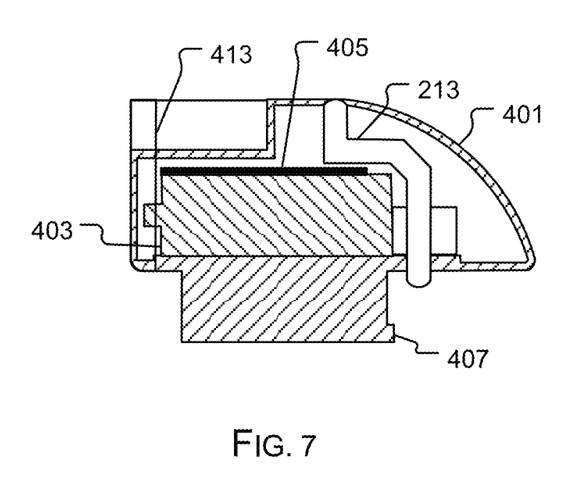
FIG. 7 is a cross sectional side view of the battery of FIG. 4.

In FIGS. 5-7, various views further depict the features of battery 203 for clarity.

Figure 8:
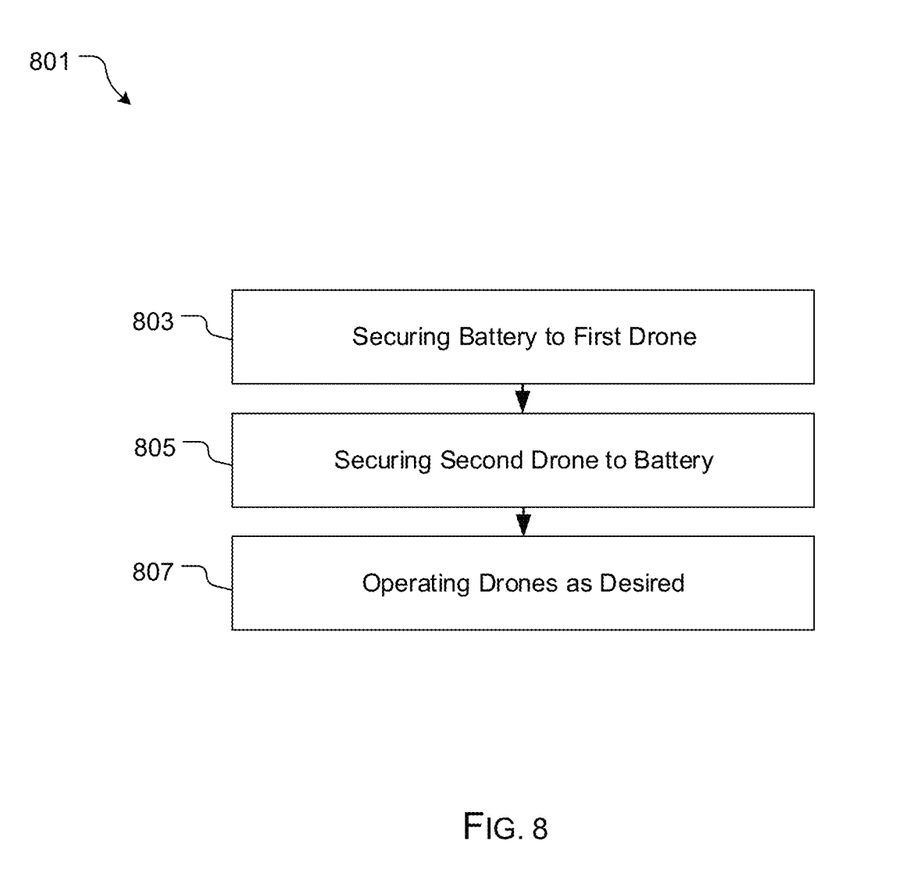
FIG. 8 is a flowchart of the method of use of the system of FIGS. 2A and 2B.

In FIG. 8, a flowchart 801 depicts the method of use system 201. During use, the user secures the battery to one drone, as shown with box 803. The user can then operate the single drone alone, or can attach a second drone to the battery, as shown with box 805. The user can then operate the combined system with multiple drones, as desired, as shown with box 807.

Figure 9:
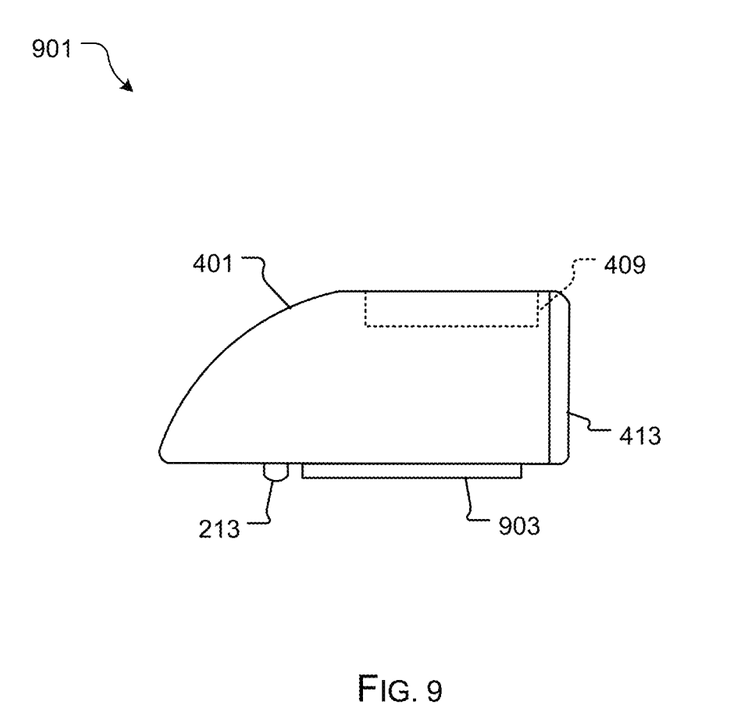
FIG. 9 is a side view of an alternative embodiment of a battery in accordance with the present invention.

In FIG. 9, a side view depicts an alternative embodiment of a battery 901 having the main components discussed above, but further including an attachment device 903, being different from the rail attachment discussed above. Attachment device 903 can be a magnetic attachment configured to secure to a body of the drone via magnetic connection. Alternatively, attachment device 903 could be a latch configured to secure the battery to the drone by any known means.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A battery comprising:
   a housing configured to engage with a first drone, the housing having an internal cavity, the housing forming a slide extending into a top surface of the housing;
   wherein a first rail of a second drone is configured to slidingly engage with the slide of the housing and
   a power source secured within the housing;
   a lever configured to extend through the housing, engage with a control system of the first drone, engage with a lever base of the second drone, and transfer power from the power source a second battery of the second drone.

* * * * *